United States Patent
Haas

(10) Patent No.: US 7,502,684 B2
(45) Date of Patent: Mar. 10, 2009

(54) METHOD AND SYSTEM FOR THE AUTOMATIC PILOTING OF AN AIRCRAFT ON THE APPROACH TO AN AIRDROP POSITION

(75) Inventor: Philippe Haas, Toulouse (FR)

(73) Assignee: Airbus France, Toulouse (FR)

( * ) Notice: Subject to any disclaimer, the term of this patent is extended or adjusted under 35 U.S.C. 154(b) by 668 days.

(21) Appl. No.: 11/002,182

(22) Filed: Dec. 3, 2004

(65) Prior Publication Data
US 2005/0143904 A1 Jun. 30, 2005

(30) Foreign Application Priority Data
Dec. 4, 2003 (FR) .................................. 03 14242

(51) Int. Cl.
G06F 17/00 (2006.01)
G06F 19/00 (2006.01)
G01C 21/30 (2006.01)

(52) U.S. Cl. .......................... 701/121; 701/4; 701/120; 701/210; 244/185

(58) Field of Classification Search .............. 701/3, 701/4, 14, 11, 18, 23, 120, 301, 206; 244/185, 244/195; 342/36, 456
See application file for complete search history.

(56) References Cited

U.S. PATENT DOCUMENTS

| | | | | |
|---|---|---|---|---|
| 3,875,379 A | * | 4/1975 | Vietor | 701/121 |
| 4,709,336 A | * | 11/1987 | Zweifel | 701/5 |
| 4,750,127 A | * | 6/1988 | Leslie et al. | 701/16 |
| 5,377,937 A | * | 1/1995 | LaMay et al. | 244/185 |
| 5,867,804 A | * | 2/1999 | Pilley et al. | 701/120 |
| 6,507,782 B1 | | 1/2003 | Rumbo et al. | |
| 6,832,153 B2 | * | 12/2004 | Thayer et al. | 701/207 |
| 7,219,011 B1 | * | 5/2007 | Barber | 701/205 |
| 7,283,895 B2 | * | 10/2007 | Bouchet | 701/3 |
| 7,346,437 B2 | * | 3/2008 | Petillon | 701/3 |

FOREIGN PATENT DOCUMENTS

EP 0637787 2/1995

OTHER PUBLICATIONS

Preliminary Search Report dated Jul. 8, 2004.

* cited by examiner

*Primary Examiner*—Ronnie Mancho
(74) *Attorney, Agent, or Firm*—Dickinson Wright, PLLC

(57) ABSTRACT

A method of automatic piloting of an aircraft during a phase of approach to a predetermined airdrop position includes automatically applying a speed profile with decreasing speed such that the aircraft will reach the airdrop position at a predetermined theoretical arrival time with a predetermined speed, the speed profile having a plurality of constant-speed levels separated by deceleration phases. An actual arrival time is automatically determined and a difference between the theoretical and actual arrival times is calculated. If the calculated difference differs from zero, the speed profile is corrected by modifying the length lengths of time that at least two constant-speed levels are applied to the aircraft so as to cancel the difference.

16 Claims, 6 Drawing Sheets

METHOD AND SYSTEM FOR THE AUTOMATIC PILOTING OF AN AIRCRAFT ON THE APPROACH TO AN AIRDROP POSITION

FIELD OF THE INVENTON

The present invention relates to a method and system for the automatic piloting of an aircraft on the approach to an airdrop position.

BACKGROUND OF THE RELATED ART

In order to carry out an airdrop, for example of hardware and/or troops, it is generally necessary for the aircraft, for example a military transport plane, to arrive at the airdrop position planned during mission preparation at a predetermined arrival time, so as to be able to make the airdrop at the scheduled time, in particular when troops are on the ground to receive the airdropped elements. Moreover, to facilitate the airdrop, it is preferable for the aircraft to arrive at said airdrop position with a constant predetermined speed.

Also, to be able to fulfill these conditions, a particular speed profile with decreasing speed is generally determined and is applied to the aircraft during the approach phase, between the cruising speed and said predetermined airdrop speed. Moreover, to facilitate the work of the releaser and to avoid too much jerkiness, such a speed profile generally comprises a plurality of constant-speed levels separated by deceleration phases.

Of course, this speed profile is determined during mission preparation. It takes no account of the wind.

Under these conditions, the predetermined speed profile is not optimal and does not make it possible to reach the airdrop position at the scheduled arrival time so that the airdrop is then made either early or late relative to the scheduled time.

SUMMARY OF THE INVENTION

An object of the present invention is to remedy these drawbacks. It relates to a method of automatic piloting of an aircraft during a phase of approach to a predetermined airdrop position, at which an airdrop is to be made from said aircraft, making it possible to devise and apply to said aircraft an optimal speed profile which allows the latter to reach said airdrop position exactly at the initially scheduled time.

For this purpose, said method, according to which:
  in the course of said approach phase, a speed profile with decreasing speed comprising a plurality of constant-speed levels, separated by deceleration phases, is applied automatically to the aircraft; and
  the aircraft must reach said airdrop position at a predetermined theoretical arrival time, with a predetermined speed, is noteworthy, according to the invention, in that, in the course of said approach phase, automatically:
  an actual arrival time at which the aircraft will actually reach said airdrop position is determined;
  the difference between said theoretical and actual arrival times is calculated; and
  if this difference differs from zero;
    said speed profile is corrected by modifying the length of at least two constant-speed levels in such a way as to cancel said difference; and
    said speed profile thus corrected is applied to said aircraft.

Thus, by virtue of the invention, the speed profile is corrected, if necessary, in such a way as to have (and to apply to the aircraft) permanently an optimal speed profile making it possible to reach said airdrop position at said predetermined theoretical arrival time.

This correction may be made throughout the approach phase. Moreover, it is implemented automatically, thereby allowing the crew to be unburdened of this task and to concentrate on other tasks or actions that are necessary, in particular with a view to the airdrop.

Furthermore, said correction is made in a simple and fast manner, but without modifying the overall aspect of the speed profile.

When said actual arrival time is later than said theoretical arrival time, that is to say when the aircraft is late, advantageously, the length of at least one first level exhibiting a first constant speed is increased, and the length of at least one second level exhibiting a second constant speed is decreased, said first speed being greater than said second speed.

In this case, advantageously, said first level is increased and said second level is decreased by one and the same length xa which satisfies the following relation:

$$xa = \left| \frac{\Delta t \cdot Vi \cdot Vj}{(Vj - Vi)} \right|$$

in which:
  $\Delta t$ represents said time difference (between said theoretical and actual arrival times);
  Vi represents said first constant speed; and
  Vj represents said second constant speed.

Furthermore, when said actual arrival time is earlier than said theoretical arrival time, that is to say when the aircraft is early, advantageously, the length of at least one first level exhibiting a first constant speed is decreased, and the length of at least one second level exhibiting a second constant speed is increased, said first speed being greater than said second speed.

In this case, advantageously, said first level is decreased and said second level is increased by one and the same length xb which satisfies the following relation:

$$xb = \left| \frac{\Delta t \cdot Vi \cdot Vj}{(Vi - Vj)} \right|$$

in which:
  $\Delta t$ represents said time difference (between said theoretical and actual arrival times);
  Vi represents said first constant speed; and
  Vj represents said second constant speed.

In a particular embodiment:
  the length of more than two constant-speed levels is modified; and/or
  the length of at least one constant-speed level is decreased completely in such a way as to eliminate this level.

The present invention also relates to a system for the automatic piloting of an aircraft so as to pilot said aircraft at least during a phase of approach to a predetermined airdrop position, at which an airdrop is to be made from said aircraft.

According to the invention, said system of the type comprising:
- a first means for providing a speed profile that has to allow the aircraft to reach said airdrop position at a predetermined theoretical arrival time, with a predetermined speed;
- an automatic piloting device for determining orders for piloting the aircraft so that it follows said speed profile; and
- means of actuation of controlled members of the aircraft, to which said piloting orders are applied, is noteworthy in that it moreover comprises:
- a second means for determining an actual arrival time at which the aircraft will actually reach said airdrop position; and
- a third means for correcting said speed profile, as a function of said actual arrival time and of said theoretical arrival time, the speed profile thus corrected being provided to said automatic piloting device to determine corresponding piloting orders which are applied to said means of actuation.

In a particular embodiment, said first means comprises a diskette, on which is recorded said speed profile, and which can be read, with the aid of a suitable means of reading, by said automatic piloting device, this making it possible to devise the speed profile during mission preparation and to record it on said diskette. It is then sufficient to simply enter said diskette into said reading means in order for the automatic piloting device to take account of said recorded speed profile, thus making it possible to considerably decrease the workload of the crew.

Furthermore, advantageously, said third means is integrated into said automatic piloting device.

BRIEF DESCRIPTION OF THE DRAWINGS

The figures of the appended drawing will elucidate the manner in which the invention may be embodied. In these figures, identical references designate similar elements.

DETAILED DESCRIPTON OF THE INVENTION

Figure 1:
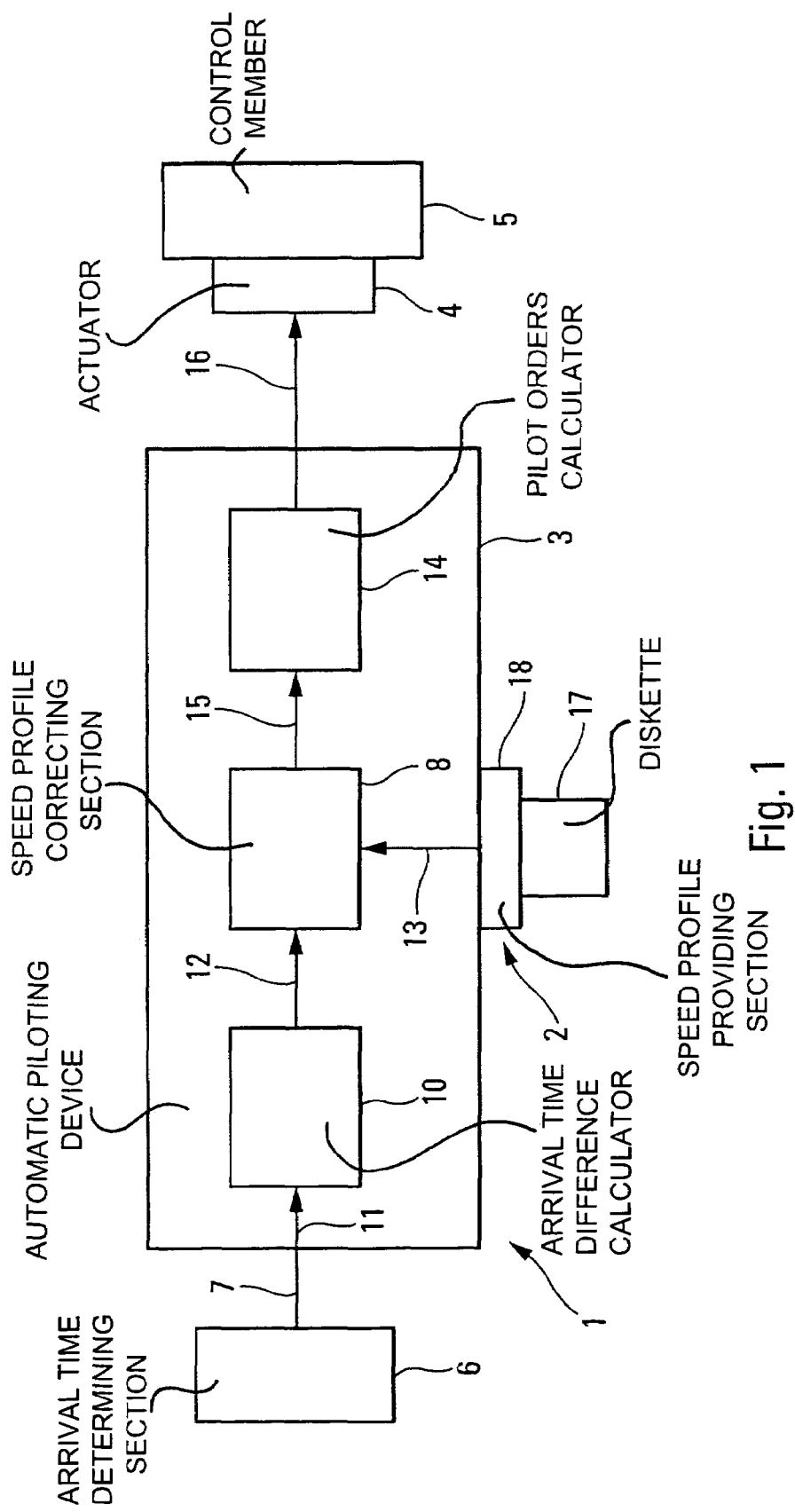
FIG. 1 is the schematic diagram of a piloting system in accordance with the invention.

The system 1 in accordance with the invention and represented diagrammatically in FIG. 1 is intended for the automatic piloting of an aircraft (not represented), for example a military transport plane, so as to pilot said aircraft at least during a phase of approach to a predetermined airdrop position, at which an airdrop of hardware and/or of troops is to be made from said aircraft.

Said system 1 comprises:
- a means 2 for providing a speed profile PV that allows the aircraft to reach said airdrop position at a predetermined theoretical arrival time TO, with a predetermined speed;
- an automatic piloting device 3, for example an automatic pilot, for determining orders for piloting the aircraft so that it follows said speed profile PV; and
- means of actuation 4 of controlled members 5 such as for example control surfaces (rudder, elevators, etc.) of the aircraft, which means of actuation 4 are connected to said device 3 and to which the piloting orders determined by the latter are applied.

To be able to automatically update said speed profile PV, essentially when the aircraft is in said approach phase, said system 1 moreover comprises:
- a means 6 which is connected by a link 7 to the device 3, for determining an actual arrival time Teff, at which the aircraft will actually reach said airdrop position, on the basis of information currently available (the current position of the aircraft and current conditions such as the characteristics of the wind, etc.); and
- a means 8 which is integrated into the device 3, for correcting said speed profile PV, as a function of said actual arrival time Teff and of said theoretical arrival time TO, the speed profile thus corrected being used to calculate new piloting orders which are applied to said means of actuation 4.

Figure 2:
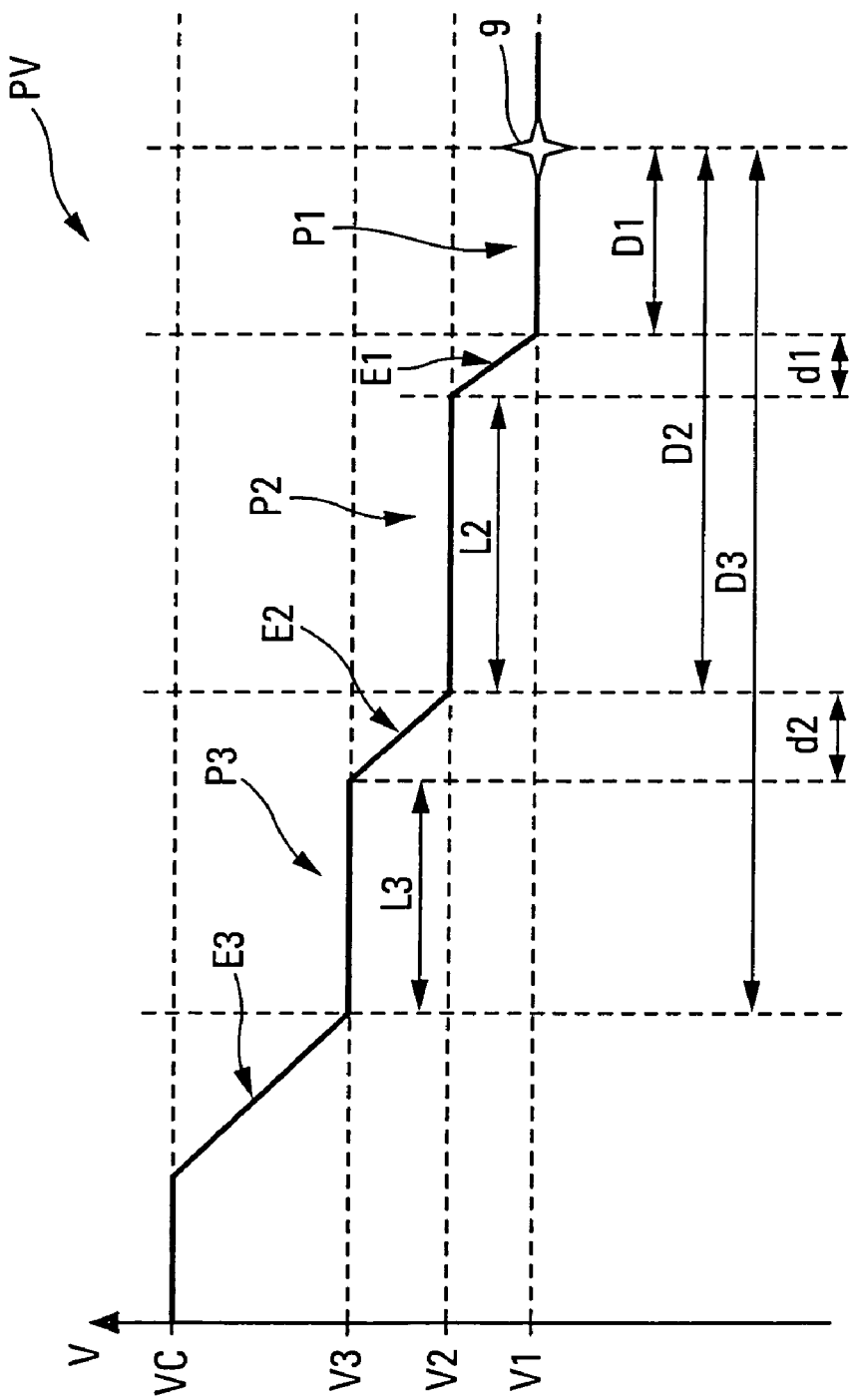
FIGS. 2 to 6 are graphs showing various speed profiles, allowing proper comprehension of the present invention.

According to the invention, the speed profile PV, whose speed V is applied to the aircraft between an earlier cruising phase at constant speed VC and the airdrop position 9 reached at a speed V1 comprises, as represented in FIG. 2:
- levels P1, P2, P3 at constant speed, respectively at speeds V1, V2 and V3; and
- deceleration phases E1, E2, E3, which each time connect two successive levels P1, P2, P3. Preferably, said deceleration phases E1, E2, E3 exhibit the same deceleration factor a.

Since the speeds V1, V2 and V3 are constant values, as is said deceleration factor a, the same holds for the distances d1 and d2 for switching respectively from the speeds V2 to V1 and V3 to V2 or the corresponding times t1 and t2 necessary for this deceleration. Specifically, these parameters satisfy the following relations:

$$\begin{cases} t1 = (V1 - V2)/a \\ t2 = (V2 - V3)/a \\ d1 = (V1 - V2) \cdot (V1 + V2)/(2a) \\ d2 = (V2 - V3) \cdot (V2 + V3)/(2a) \end{cases}$$

The same holds for any parameter tn or dn between a speed Vn+1 of a level Pn+1 and a speed Vn of a level Pn according to:

$$\begin{cases} tn = (Vn - Vn+1)/a \\ dn = (Vn - Vn+1) \cdot (Vn + Vn+1)/(2a) \end{cases}$$

According to the invention, said device 3 comprises:
- a means 10 which is connected by a link 11 to the means 6, for calculating the difference $\Delta t$ between said theoretical and actual arrival times TO and Teff: $\Delta t = $Teff$-$TO;
- said means 8 which is connected by a link 12 to the means 10, which compares this difference $\Delta t$ with zero and which, if this difference $\Delta t$ differs from zero, corrects said speed profile PV received from the means 2 via a link 13, by modifying the length of at least two constant-speed levels in such a way as to cancel said difference $\Delta t$; and
- a means 14 which is connected by a link 15 to the means 8, which receives the speed profile (corrected or otherwise) from said means 8 and which calculates piloting orders in accordance with this speed profile, which it transmits to said means of actuation 4 by way of a link 16.

In a particular embodiment, said means 2 comprises a diskette 17, on which is recorded said speed profile PV, and which can be read, with the aid of a means of reading 18, by said automatic piloting device 3.

This makes it possible to devise the speed profile PV during mission preparation and to record it on said diskette 17. It is then sufficient to simply enter said diskette 17 into said reading means 18 in order for the automatic piloting device 13 to take account of said recorded speed profile PV, thus making it possible to considerably decrease the workload of the crew.

More precisely, according to the invention, when said actual arrival time Teff is later than said theoretical arrival time TO, that is to say when the aircraft is late with respect to the scheduled time, in order to make up for this lateness, the length of at least one first level, for example the level P3, exhibiting a first constant speed (for example V3) is increased, and the length of at least one second level, for example the level P2, exhibiting a second constant speed (for example V2) which is less than said first constant speed (for example V3) is decreased.

In this case, when the length of only said two levels P3 and P2 is modified, said level P3 is increased and said level P2 is decreased by one and the same length x1 which satisfies the following relation:

$$X1 = \left| \frac{\Delta t \cdot V2 \cdot V3}{(V2 - V3)} \right|$$

Figure 3:
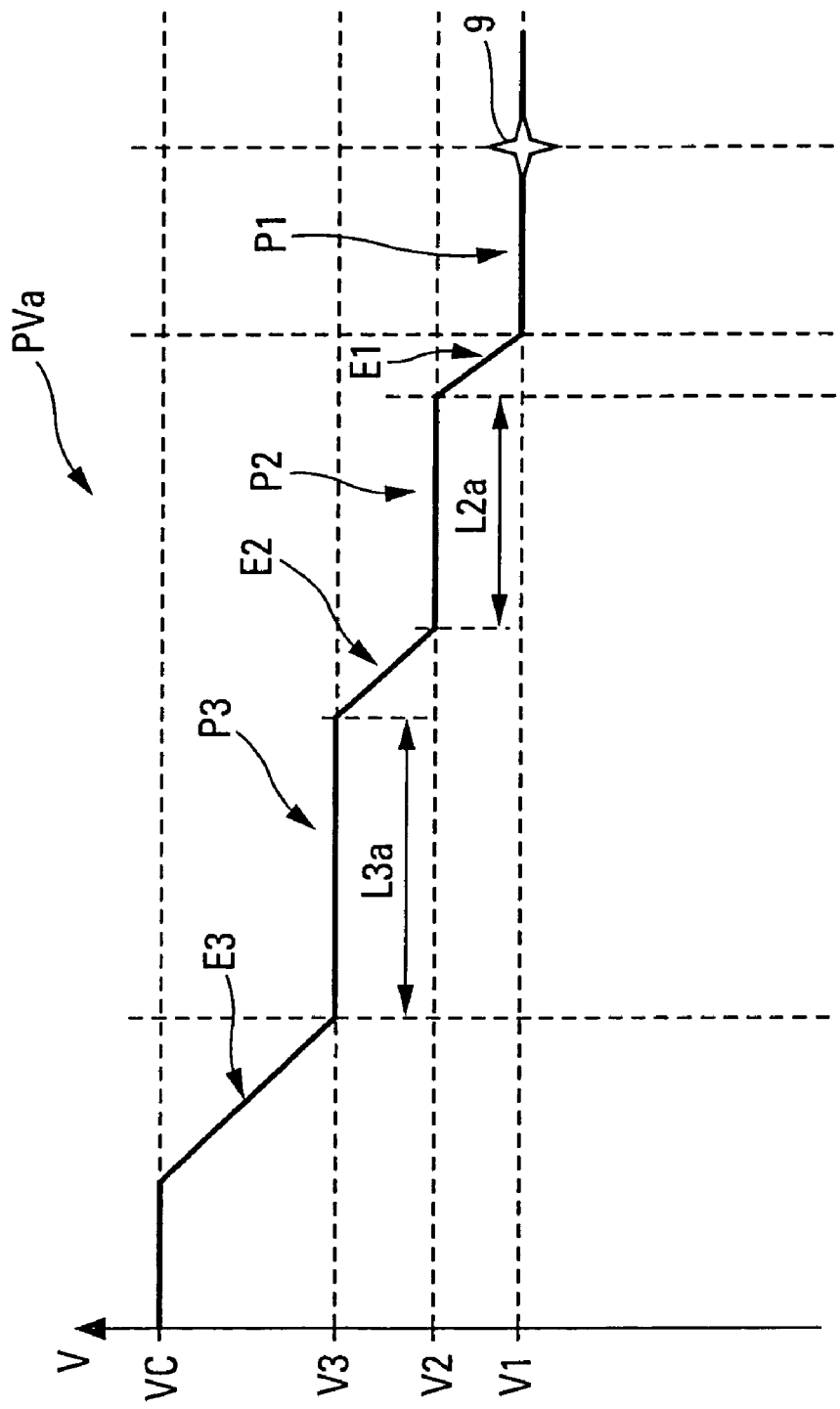

The level P3 then exhibits a length L3a=L3+x1 and the level P2 a length L2a=L2−x1, as represented in FIG. 3 which shows the speed profile PVa obtained by this correction.

Such a modification of the length of level is possible up to a maximum value of x1 which satisfies:

x1=D2−D1−d1, this corresponding to a maximum lateness that can be made up for of Δt=(D2−D1−d1).(V3−V2)/(V3.V2).

It will be noted that D1, D2 and D3 represent the distances between the airdrop position 9 and the starts respectively of said levels P1, P2 and P3, as represented in FIG. 2.

It will be furthermore noted that the time required to reach the airdrop position 9, from the start of the level P3, is:

ti=(D3−D2−d2)/V3+t2+(D2−D1−d1)/V2+t2+D1/V1, with the uncorrected initial speed profile PV of FIG. 2; and tj=(D3+x1−D2−d2)/V3+t2+(D2−D1−x1−d1)/V2+t1+D1/V1, with the corrected speed profile PVa of FIG. 3.

Additionally, according to the invention, when said actual arrival time Teff is earlier than said theoretical arrival time TO, that is to say when the aircraft is early with respect to the scheduled time, in order to cancel this earliness, the length of at least one first level, for example the level P3, exhibiting a first constant speed (for example V3) is decreased, and the length of at least one second level, for example the level P2, exhibiting a second constant speed (for example V2) which is less than said first constant speed (for example V3) is increased.

In this case, when the length of only the two levels P3 and P2 is modified, said level P3 is increased and said level P2 is decreased by one and the same length x2 which satisfies the following relation:

$$X2 = \left| \frac{\Delta t \cdot V2 \cdot V3}{(V2 - V3)} \right|$$

Figure 4:
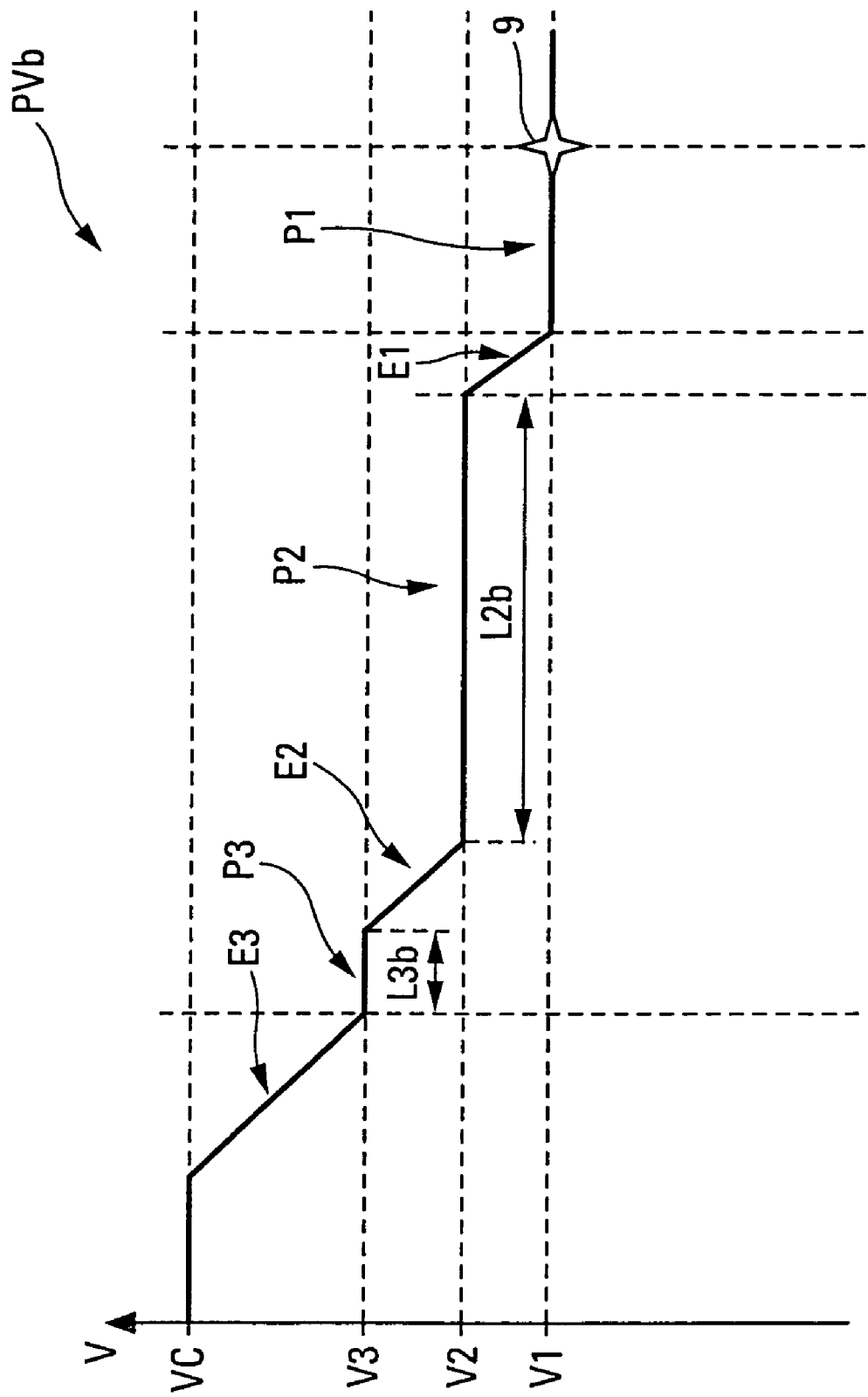

The level P3 then exhibits a length L3b=L3−x2 and the level P2 a length L2b=L2+x2, as represented in FIG. 4 which shows the speed profile PVb obtained by this correction.

Such a modification is possible up to a maximum value of x2 which satisfies:

x2=D3−D2−d2, this corresponding to a maximum earliness that can be delayed of

Δt=(D3−D2−d2).(V3−V2)/(V3.V2).

It will be noted that the time tk required to reach the airdrop position 9, from the start of the level P3, then satisfies the relation:

tk=(D3−D2−d2−x1)/V3+t2+(D2−D1−d1+x1)/V2+t1+D1/V1, with the corrected speed profile Pvb of FIG. 4.

Figure 5:
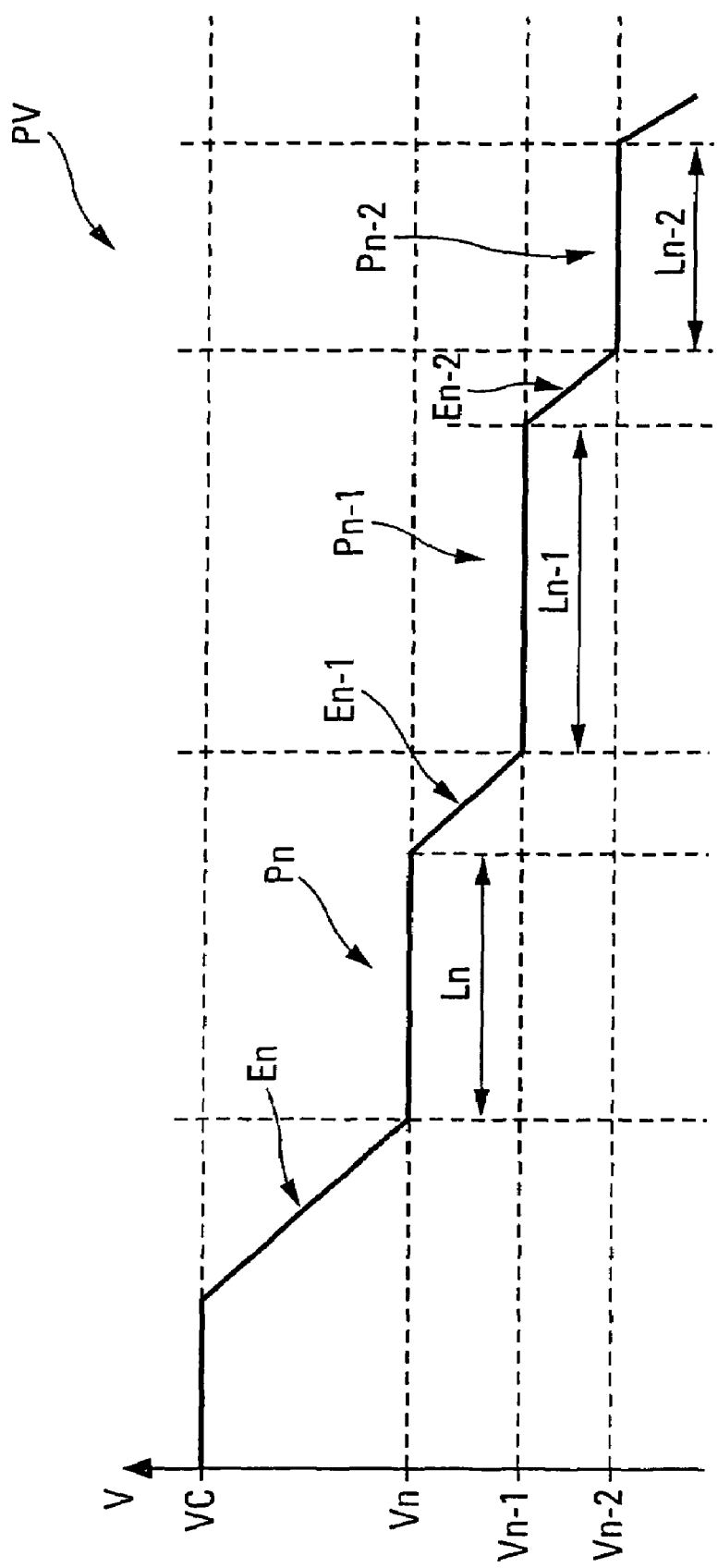

More generally, when the speed profile PV comprises n levels P1, P2, . . . , Pn−2, Pn−1, Pn, respectively of constant speeds V1 to Vn, as represented partially in FIG. 5, it is possible to apply the modification of length of levels in accordance with the invention, to any two (or more than any two) of said n levels P1 to Pn.

Thus, by applying it between a level Pn and a level Pn−1, it is possible:

either to make up for a duration t1 such that:

tl=(Dn−1−Dn−2−dn−2) (Vn−Vn−1)/(Vn.Vn−1);

or to slow down the flight by a duration tm such that:

tm=(Dn−Dn−1−dn−1) (Vn−Vn−1)/(Vn.Vn−1).

If such a duration tl or tm is insufficient, it is possible to carry out the same operation between two other levels, for example the levels Pn−1 and Pn−2 of the speed profile, and so and so forth if necessary.

Figure 6:
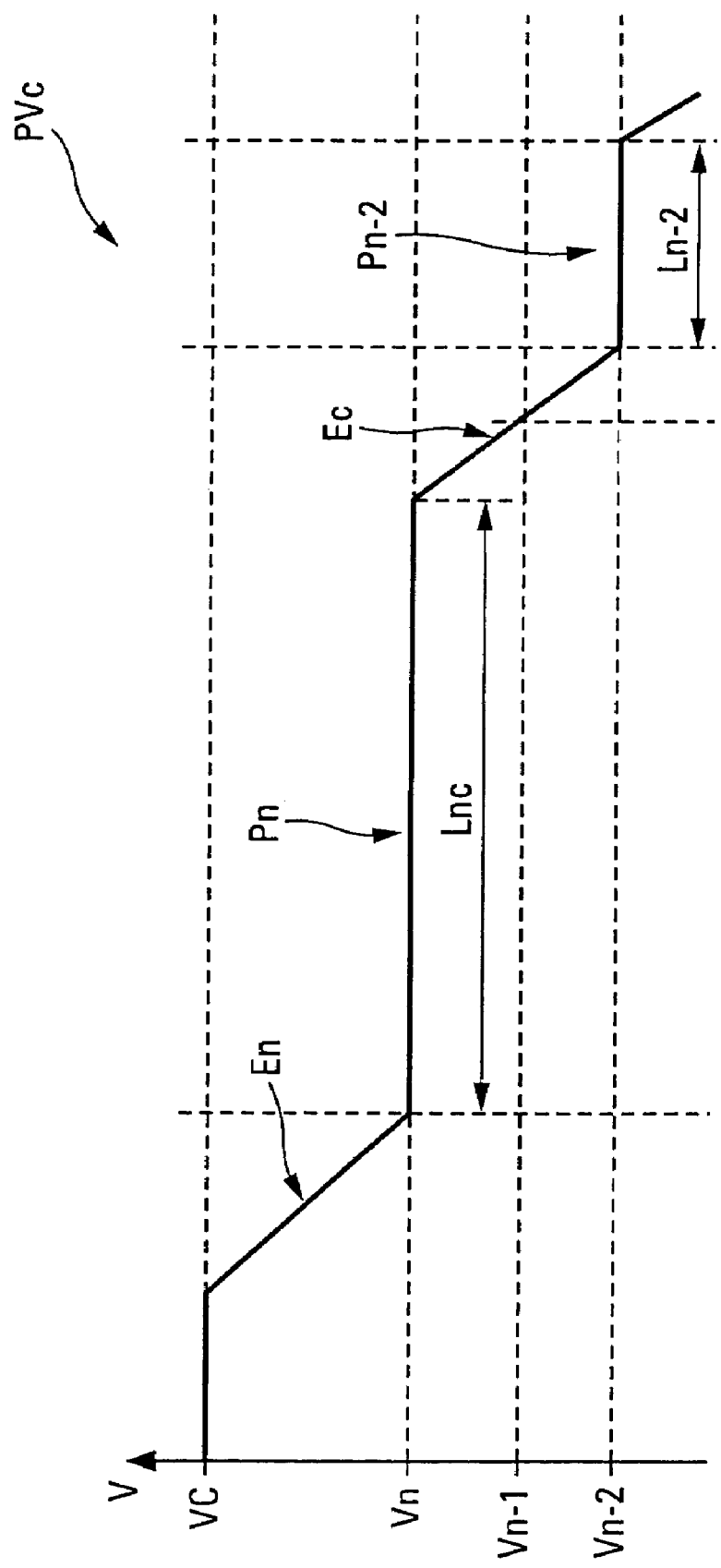

In a particular embodiment, it is possible to decrease the length of a level Pn−1 until it is completely eliminated, as represented in FIG. 6.

In this case, the corrected speed profile PVc exhibits a level Pn of length Lnc=Ln+Ln−1 and the deceleration phase Ec between the levels Pn and Pn−2 exhibits the length (and hence the duration) of the two initial deceleration phases En−1 and En−2 represented in FIG. 5. The correction illustrated in FIG. 6, for which the length Ln−1 of the eliminated level Pn−1 is transmitted to a level Pn at greater constant speed Vn enables a lateness to be made up for.

On the other hand, if it is necessary to delay earliness, this length Ln−1 of the eliminated level Pn−1 is transmitted to a level Pn−2 at lower constant speed Vn−2.

Consequently, the system 1 in accordance with the invention corrects, if necessary, the speed profile PV in such a way as to have (and to apply to the aircraft) permanently an optimal speed profile making it possible to reach said airdrop position 9 at said predetermined theoretical arrival time TO.

This correction may be made throughout the approach phase. Moreover, it is implemented automatically by said system 1, thereby allowing the crew to be unburdened of this task and to concentrate on other tasks or actions that are necessary, in particular with a view to the airdrop.

Furthermore, the correction implemented by the system 1 is made in a simple and fast manner, but without modifying the overall aspect of the speed profile PV.

The invention claimed is:

1. A method of automatic piloting of an aircraft during a phase of approach to a predetermined airdrop position, at which an airdrop is to be made from said aircraft, the method comprising:

automatically applying to said aircraft, during said approach phase, a speed profile with decreasing speed, the speed profile comprising a plurality of constant-speed levels separated by deceleration phases such that the aircraft will reach said airdrop position at a predetermined theoretical arrival time with a predetermined speed;

automatically determining, during said approach phase, an actual arrival time at which the aircraft will actually reach said airdrop position, wherein a difference between said theoretical and actual arrival times is calculated and if this difference differs from zero, said speed profile is corrected by modifying lengths of time that at least two constant-speed levels are applied to the aircraft in such a way as to cancel said difference; and automatically applying, during said approach phase, said corrected speed profile to said aircraft.

2. The method as claimed in claim 1, wherein, when said actual arrival time is later than said theoretical arrival time, a length of time that at least one first level exhibiting a first constant speed is applied to said aircraft is increased and a length of time that at least one second level exhibiting a second constant speed is applied to said aircraft is decreased, said first speed being greater than said second speed.

3. The method as claimed in claim 2, wherein said first level is increased and said second level is decreased by one and the same length of time xa which satisfies the following relation:

$$xa = \left|\frac{\Delta t \cdot Vi \cdot Vj}{(Vj - Vi)}\right|$$

in which:

$\Delta t$ represents said time difference;

$Vi$ represents said first constant speed; and $Vj$ represents said second constant speed.

4. The method as claimed in claim 1, wherein, when said actual arrival time is earlier than said theoretical arrival time, a length of time that at least one first level exhibiting a first constant speed is applied to said aircraft is decreased and a length of time that at least one second level exhibiting a second constant speed is applied to said aircraft is increased, said first speed being greater than said second speed.

5. The method as claimed in claim 4, wherein said first level is decreased and said second level is increased by one and the same length of time xb which satisfies the following relation:

$$xb = \left|\frac{\Delta t \cdot Vi \cdot Vj}{(Vi - Vj)}\right|$$

in which:

$\Delta t$ represents said time difference;

$Vi$ represents said first constant speed; and $Vj$ represents said second constant speed.

6. The method as claimed in claim 1, wherein lengths of time that more than two constant-speed levels are applied to said aircraft are modified.

7. The method as claimed in claim 1, wherein a length of time that at least one constant-speed level is applied to said aircraft is decreased completely in such a way as to eliminate this level.

8. An aircraft, which comprises a system able to implement the method specified under claim 1.

9. A system for the automatic piloting of an aircraft so as to pilot said aircraft at least during a phase of approach to a predetermined airdrop position, at which an airdrop is to be made from said aircraft, said system comprising:

a first unit that provides a speed profile that has to allow the aircraft to reach said airdrop position at a predetermined theoretical arrival time, with a predetermined speed;

an automatic piloting device for determining orders for piloting the aircraft so that it follows said speed profile; and an actuation unit that actuates controlled members of the aircraft, to which said piloting orders are applied, which system moreover comprises:

a second unit that determines an actual arrival time at which the aircraft will actually reach said airdrop position; and a third unit that corrects said speed profile, as a function of said actual arrival time and of said theoretical arrival time, the speed profile thus corrected being provided to said automatic piloting device to determine corresponding piloting orders which are applied to said actuation unit.

10. The system as claimed in claim 9, wherein said first unit comprises a diskette, on which is recorded said speed profile and which can be read, with the aid of a reading unit, by said automatic piloting device.

11. The system as claimed in claim 9, wherein said third unit is integrated into said automatic piloting device.

12. An aircraft, which comprises a system such as that specified under claim 9.

13. A system for automatic piloting of an aircraft during a phase of approach to a predetermined airdrop position, at which an airdrop is to be made from said aircraft, said system comprising:

a section for automatically applying to the aircraft, in a course of said approach phase, a speed profile with decreasing speed comprising a plurality of constant-speed levels separated by deceleration phases, such that the aircraft reaches said airdrop position at a predetermined theoretical arrival time with a predetermined speed, a section for automatically determining, in the course of said approach phase, an actual arrival time at which the aircraft will actually reach said airdrop position;

a section for calculating a difference between said theoretical and actual arrival times;

a section for correcting, if said difference differs from zero, said speed profile by modifying lengths of time that at least two constant-speed levels are applied to said aircraft so as to cancel said difference; and a section for applying said speed profile thus corrected to said aircraft.

14. The system as claimed in claim 13, wherein said section for automatically applying said speed profile comprises a diskette, on which is recorded said speed profile, and which can be read, with the aid of a reading unit, by said automatic piloting device.

15. The system as claimed in claim 13, wherein said section for correcting is integrated into said automatic piloting device.

16. An aircraft, which comprises a system such as that specified under claim 13.

* * * * *